(12) United States Patent
Sugimoto et al.

(10) Patent No.: US 8,284,300 B2
(45) Date of Patent: Oct. 9, 2012

(54) ELECTRONIC CAMERA

(75) Inventors: Hiroshi Sugimoto, Osaka (JP); Takanori Sato, Osaka (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 416 days.

(21) Appl. No.: 12/541,740

(22) Filed: Aug. 14, 2009

(65) Prior Publication Data

US 2010/0045848 A1    Feb. 25, 2010

(30) Foreign Application Priority Data

Aug. 22, 2008 (JP) ................ 2008-213839

(51) Int. Cl.
*H04N 5/235* (2006.01)
(52) U.S. Cl. ...................... 348/362; 348/345
(58) Field of Classification Search .............. 348/362, 348/363, 364, 234, 345
See application file for complete search history.

(56) References Cited

U.S. PATENT DOCUMENTS

| | | | | |
|---|---|---|---|---|
| 7,456,870 B2 * | 11/2008 | Shiraishi et al. | ........... | 348/231.3 |
| 7,576,797 B2 * | 8/2009 | Kehtarnavaz et al. | ........ | 348/364 |
| 2003/0197792 A1 | 10/2003 | Kikuchi | | |

FOREIGN PATENT DOCUMENTS

| | | |
|---|---|---|
| JP | 2003-46858 A | 2/2003 |
| JP | 2003-110926 A | 4/2003 |
| JP | 2003-315867 A | 11/2003 |
| JP | 2003-344891 A | 12/2003 |
| JP | 2007-300348 A | 11/2007 |

OTHER PUBLICATIONS

Japanese Office Action dated May 22, 2012, issued in corresponding Japanese patent application No. 2008-213839, with English translation.

* cited by examiner

*Primary Examiner* — Tuan Ho
(74) *Attorney, Agent, or Firm* — Westerman, Hattori, Daniels & Adrian, LLP (57) ABSTRACT

An electronic camera includes an imaging device. The imaging device has an imaging surface irradiated with an optical image of an object scene. A CPU executes an AF process based on output of an AF evaluating circuit to adjust a position of a focus lens to a position to be optically converged on a specific object present in an object scene. Upon completion of the AF process, the CPU detects a distance from a lens distal end to the specific object by referencing a current position of the focus lens, and further detects brightness information of the object scene based on output of an AE/AWB evaluating circuit. Moreover, the CPU adjusts an imaging parameter by determining whether or not an object scene attribute including the detected distance and brightness information satisfies a predetermined condition.

13 Claims, 13 Drawing Sheets

BKupr

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 16 | 17 | 18 | 19 | 20 | 21 | 22 | 23 | 24 | 25 | 26 | 27 | 28 | 29 | 30 | 31 |
| 32 | 33 | 34 | 35 | 36 | 37 | 38 | 39 | 40 | 41 | 42 | 43 | 44 | 45 | 46 | 47 |
| 48 | 49 | 50 | 51 | 52 | 53 | 54 | 55 | 56 | 57 | 58 | 59 | 60 | 61 | 62 | 63 |
| 64 | 65 | 66 | 67 | 68 | 69 | 70 | 71 | 72 | 73 | 74 | 75 | 76 | 77 | 78 | 79 |
| 80 | 81 | 82 | 83 | 84 | 85 | 86 | 87 | 88 | 89 | 90 | 91 | 92 | 93 | 94 | 95 |
| 96 | 97 | 98 | 99 | 100 | 101 | 102 | 103 | 104 | 105 | 106 | 107 | 108 | 109 | 110 | 111 |
| 112 | 113 | 114 | 115 | 116 | 117 | 118 | 119 | 120 | 121 | 122 | 123 | 124 | 125 | 126 | 127 |
| 128 | 129 | 130 | 131 | 132 | 133 | 134 | 135 | 136 | 137 | 138 | 139 | 140 | 141 | 142 | 143 |
| 144 | 145 | 146 | 147 | 148 | 149 | 150 | 151 | 152 | 153 | 154 | 155 | 156 | 157 | 158 | 159 |
| 160 | 161 | 162 | 163 | 164 | 165 | 166 | 167 | 168 | 169 | 170 | 171 | 172 | 173 | 174 | 175 |
| 176 | 177 | 178 | 179 | 180 | 181 | 182 | 183 | 184 | 185 | 186 | 187 | 188 | 189 | 190 | 191 |
| 192 | 193 | 194 | 195 | 196 | 197 | 198 | 199 | 200 | 201 | 202 | 203 | 204 | 205 | 206 | 207 |
| 208 | 209 | 210 | 211 | 212 | 213 | 214 | 215 | 216 | 217 | 218 | 219 | 220 | 221 | 222 | 223 |
| 224 | 225 | 226 | 227 | 228 | 229 | 230 | 231 | 232 | 233 | 234 | 235 | 236 | 237 | 238 | 239 |
| 240 | 241 | 242 | 243 | 244 | 245 | 246 | 247 | 248 | 249 | 250 | 251 | 252 | 253 | 254 | 255 |

BKlwr

(A) LEFT 90° ROTARY CONDITION

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 16 | 17 | 18 | 19 | 20 | 21 | 22 | 23 | 24 | 25 | 26 | 27 | 28 | 29 | 30 | 31 |
| 32 | 33 | 34 | 35 | 36 | 37 | 38 | 39 | 40 | 41 | 42 | 43 | 44 | 45 | 46 | 47 |
| 48 | 49 | 50 | 51 | 52 | 53 | 54 | 55 | 56 | 57 | 58 | 59 | 60 | 61 | 62 | 63 |
| 64 | 65 | 66 | 67 | 68 | 69 | 70 | 71 | 72 | 73 | 74 | 75 | 76 | 77 | 78 | 79 |
| 80 | 81 | 82 | 83 | 84 | 85 | 86 | 87 | 88 | 89 | 90 | 91 | 92 | 93 | 94 | 95 |
| 96 | 97 | 98 | 99 | 100 | 101 | 102 | 103 | 104 | 105 | 106 | 107 | 108 | 109 | 110 | 111 |
| 112 | 113 | 114 | 115 | 116 | 117 | 118 | 119 | 120 | 121 | 122 | 123 | 124 | 125 | 126 | 127 |
| 128 | 129 | 130 | 131 | 132 | 133 | 134 | 135 | 136 | 137 | 138 | 139 | 140 | 141 | 142 | 143 |
| 144 | 145 | 146 | 147 | 148 | 149 | 150 | 151 | 152 | 153 | 154 | 155 | 156 | 157 | 158 | 159 |
| 160 | 161 | 162 | 163 | 164 | 165 | 166 | 167 | 168 | 169 | 170 | 171 | 172 | 173 | 174 | 175 |
| 176 | 177 | 178 | 179 | 180 | 181 | 182 | 183 | 184 | 185 | 186 | 187 | 188 | 189 | 190 | 191 |
| 192 | 193 | 194 | 195 | 196 | 197 | 198 | 199 | 200 | 201 | 202 | 203 | 204 | 205 | 206 | 207 |
| 208 | 209 | 210 | 211 | 212 | 213 | 214 | 215 | 216 | 217 | 218 | 219 | 220 | 221 | 222 | 223 |
| 224 | 225 | 226 | 227 | 228 | 229 | 230 | 231 | 232 | 233 | 234 | 235 | 236 | 237 | 238 | 239 |
| 240 | 241 | 242 | 243 | 244 | 245 | 246 | 247 | 248 | 249 | 250 | 251 | 252 | 253 | 254 | 255 |

BKupr (left side, row 192) — BKlwr (right side, row 207)

(B) RIGHT 90° ROTARY CONDITION

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 16 | 17 | 18 | 19 | 20 | 21 | 22 | 23 | 24 | 25 | 26 | 27 | 28 | 29 | 30 | 31 |
| 32 | 33 | 34 | 35 | 36 | 37 | 38 | 39 | 40 | 41 | 42 | 43 | 44 | 45 | 46 | 47 |
| 48 | 49 | 50 | 51 | 52 | 53 | 54 | 55 | 56 | 57 | 58 | 59 | 60 | 61 | 62 | 63 |
| 64 | 65 | 66 | 67 | 68 | 69 | 70 | 71 | 72 | 73 | 74 | 75 | 76 | 77 | 78 | 79 |
| 80 | 81 | 82 | 83 | 84 | 85 | 86 | 87 | 88 | 89 | 90 | 91 | 92 | 93 | 94 | 95 |
| 96 | 97 | 98 | 99 | 100 | 101 | 102 | 103 | 104 | 105 | 106 | 107 | 108 | 109 | 110 | 111 |
| 112 | 113 | 114 | 115 | 116 | 117 | 118 | 119 | 120 | 121 | 122 | 123 | 124 | 125 | 126 | 127 |
| 128 | 129 | 130 | 131 | 132 | 133 | 134 | 135 | 136 | 137 | 138 | 139 | 140 | 141 | 142 | 143 |
| 144 | 145 | 146 | 147 | 148 | 149 | 150 | 151 | 152 | 153 | 154 | 155 | 156 | 157 | 158 | 159 |
| 160 | 161 | 162 | 163 | 164 | 165 | 166 | 167 | 168 | 169 | 170 | 171 | 172 | 173 | 174 | 175 |
| 176 | 177 | 178 | 179 | 180 | 181 | 182 | 183 | 184 | 185 | 186 | 187 | 188 | 189 | 190 | 191 |
| 192 | 193 | 194 | 195 | 196 | 197 | 198 | 199 | 200 | 201 | 202 | 203 | 204 | 205 | 206 | 207 |
| 208 | 209 | 210 | 211 | 212 | 213 | 214 | 215 | 216 | 217 | 218 | 219 | 220 | 221 | 222 | 223 |
| 224 | 225 | 226 | 227 | 228 | 229 | 230 | 231 | 232 | 233 | 234 | 235 | 236 | 237 | 238 | 239 |
| 240 | 241 | 242 | 243 | 244 | 245 | 246 | 247 | 248 | 249 | 250 | 251 | 252 | 253 | 254 | 255 |

BKlwr (left side, row 192) — BKupr (right side, row 207)

ELECTRONIC CAMERA

CROSS REFERENCE OF RELATED APPLICATION

The disclosure of Japanese Patent Application No. 2008-213839, which was filed on Aug. 22, 2008 is incorporated herein by reference.

BACKGROUND OF THE INVENTION

1. Field of the Invention

The present invention relates to an electronic camera. More particularly, the present invention relates to an electronic camera for adjusting an imaging parameter in a manner to match an object scene.

2. Description of the Related Art

According to one example of this type of camera, a proportion of a high-luminance evening scenery region to a crossing region formed on an object scene and a luminance difference in the object scene between end-portion regions facing to each other are detected by a CPU. The CPU regards the object scene as an evening view scene when the luminance difference between the end-portion regions is large and the proportion of the high-luminance evening scenery is large, and in this case, adjusts a photographing parameter to a parameter that matches an evening view scene.

However, an attribute to be noticed for determining whether or not the object scene is the evening view scene is only a luminance of the object scene. Thus, in the above-described camera, there is a limit to a capability of determining a scene, by extension, a capability for adjusting an imaging parameter.

SUMMARY OF THE INVENTION

An electronic camera according to the present invention, comprises: an imager having an imaging surface irradiated with an optical image of an object scene; a first detector for detecting a distance to a specific object present in the object scene; a second detector for detecting brightness information of the object scene in association with a detecting process of the first detector; and a determiner for determining whether or not the distance detected by the first detector and the brightness information detected by the second detector satisfy a predetermined condition so as to adjust an imaging parameter.

Preferably, further comprised are: a focus lens placed forward of the imaging surface; and an adjuster for adjusting an interval between the focus lens and the imaging surface to an interval in which the specific object is optically converged, wherein the first detector detects the distance based on an adjustment result of the adjuster.

Preferably, the predetermined condition includes a distance condition under which the distance exceeds a first threshold value.

More preferably, further comprised is a changer for changing a magnitude of the first threshold value according to a zoom factor.

Preferably, the second detector includes a whole-brightness detector for detecting a whole brightness of the object scene as at least one portion of the brightness information, and the predetermined condition includes a brightness condition under which the brightness detected by the whole-brightness detector exceeds a second threshold value.

Preferably, the second detector includes a disparity detector for detecting a disparity between an upper-portion brightness of the object scene and a lower-portion brightness of the object scene as at least one portion of the brightness information, and the predetermined condition includes a disparity condition under which the disparity detected by the disparity detector exceeds a third threshold value.

More preferably, further comprised is a sensor for sensing a rotating state of the imaging surface in a direction around an optical axis, wherein the disparity detector determines a hierarchical relationship of the object scene by referencing a sense result of the sensor.

According to the present invention, an imaging controlling program product executed by a processor of an electronic camera provided with an imager having an imaging surface irradiated with an optical image of an object scene, the imaging controlling program product comprises: a first detecting step of detecting a distance to a specific object present in the object scene; a second detecting step of detecting brightness information of the object scene in association with a detecting process of the first detecting step; and a determining step of determining whether or not the distance detected by the first detecting step and the brightness information detected by the second detecting step satisfy a predetermined condition so as to adjust an imaging parameter.

According to the present invention, an imaging controlling method executed by an electronic camera provided with an imager having an imaging surface irradiated with an optical image of an object scene, the imaging controlling method comprises: a first detecting step of detecting a distance to a specific object present in the object scene; a second detecting step of detecting brightness information of the object scene in association with a detecting process of the first detecting step; and a determining step of determining whether or not the distance detected by the first detecting step and the brightness information detected by the second detecting step satisfy a predetermined condition so as to adjust an imaging parameter.

The above described features and advantages of the present invention will become more apparent from the following detailed description of the embodiment when taken in conjunction with the accompanying drawings.

BRIEF DESCRIPTION OF THE DRAWINGS

FIG. 13(A) is an illustrative view showing one example of an allocated state of an evaluation area and an evaluation block in a state of being inclined by 90 degrees to a left; and FIG. 13(B) is an illustrative view showing one example of an allocated state of an evaluation area and an evaluation block in a state of being inclined by 90 degrees to a right.

DETAILED DESCRIPTION OF THE PREFERRED EMBODIMENTS

Figure 1:
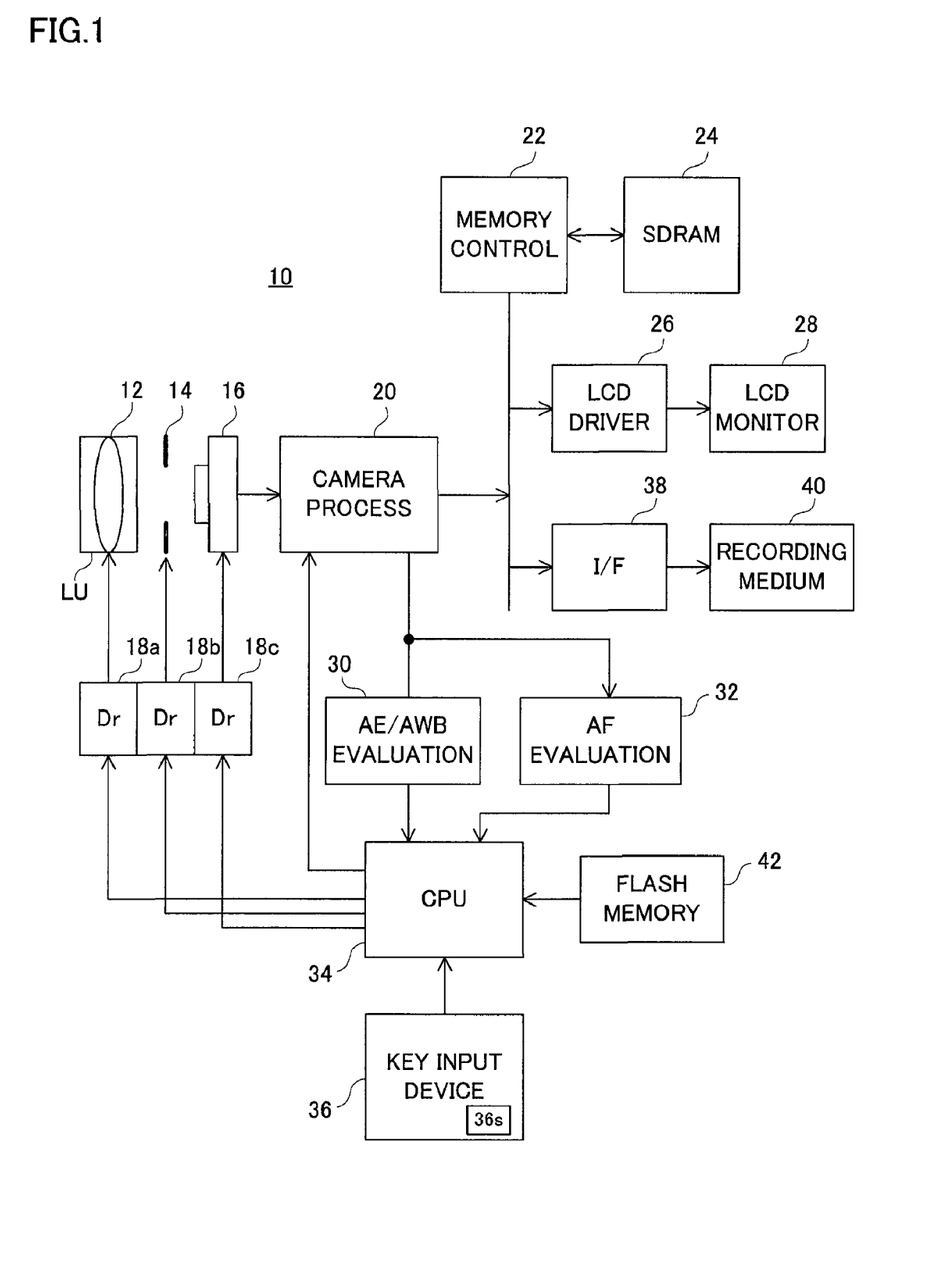
FIG. 1 is a block diagram showing a configuration of one embodiment of the present invention.

With reference to FIG. 1, a digital camera 10 according to this embodiment includes a focus lens 12 and an aperture unit 14 respectively driven by drivers 18a and 18b. An optical image of an object scene that undergoes these components is irradiated onto an imaging surface of an imaging device 16, and subjected to photoelectric conversion. Thereby, electric charges representing the object scene image are produced.

It is noted that the focus lens 12 is equivalent to one of a plurality of lenses contained in a lens unit LU placed forward of the imaging surface, and moves in an optical axis direction forward of the imaging surface. Also, the imaging surface is covered with a primary color filter not shown, and the electric charges produced by each of a plurality of pixels placed on the imaging surface have color information of any one of R (Red), G (Green), and B (Blue).

When power is inputted, in order to execute a through image process under an imaging task, a CPU 34 commands a driver 18c to repeat an exposure operation and a thinning-out reading-out operation. The driver 18c, in response to a vertical synchronization signal Vsync periodically generated from an SG (Signal Generator) not shown, exposes the imaging surface and reads out one portion of the electric charges produced on the imaging surface in a raster scanning manner. From the imaging device 16, low-resolution raw image data based on the read-out electric charges are periodically outputted.

A camera processing circuit 20 performs processes, such as a white balance adjustment, a color separation, and a YUV conversion, on the raw image data outputted from the imaging device 16, so as to produce image data of a YUV format. The produced image data is written into an SDRAM 24 through a memory control circuit 22. An LCD driver 26 repeatedly reads out the image data accommodated in the SDRAM 24 through the memory control circuit 22, and drives an LCD monitor 28 based on the read-out image data. As a result, a real-time moving image (through image) of the object scene is displayed on a monitor screen.

Figure 2:
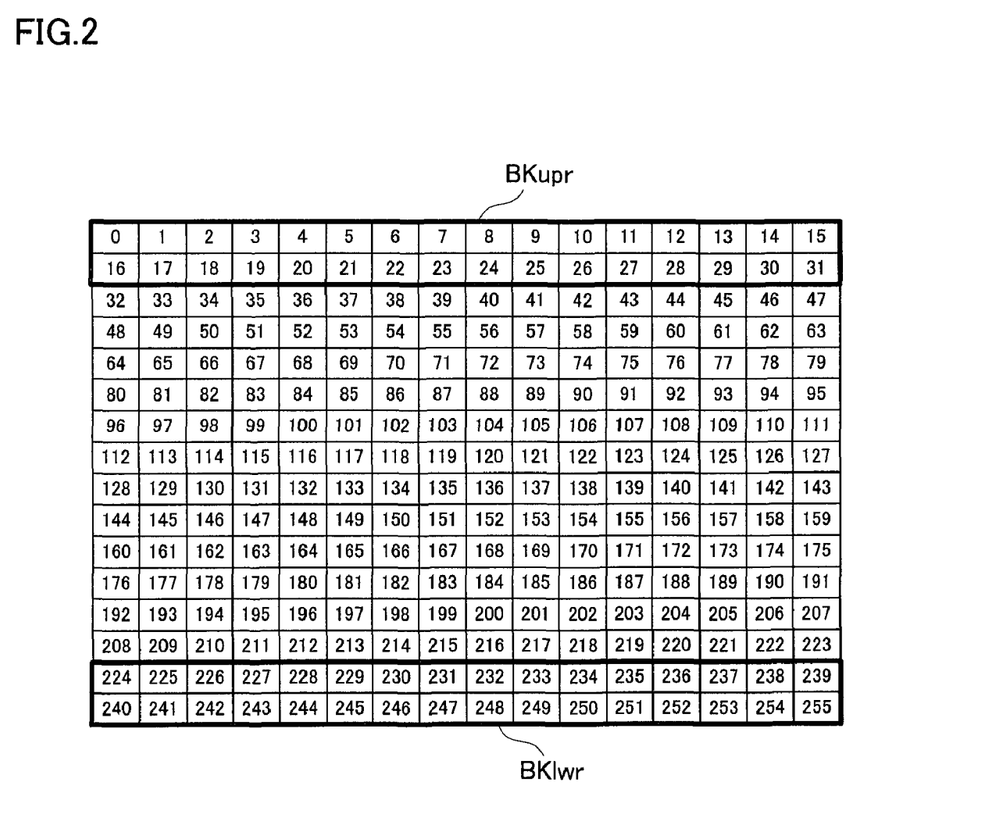
FIG. 2 is an illustrative view showing one example of an allocated state of an evaluation area and an evaluation block on an imaging surface.

With reference to FIG. 2, the imaging surface is divided into 16 portions in each of a horizontal direction and a vertical direction, and thereby, a total of 256 evaluation areas are allocated on the imaging surface. Out of these evaluation areas, 32 evaluation areas placed at an upper end form an evaluation block BKupr, and 32 evaluation areas placed at a lower end form an evaluation block BKlwr.

An AE/AWB evaluating circuit 30 integrates one portion of Y data belonging to each evaluation area, out of Y data outputted from the camera processing circuit 20, at each generation of the vertical synchronization signal Vsync. Thereby, 256 integral values, i.e., 256 AE/AWB evaluation values, are outputted from the AE/AWB evaluating circuit 30 in response to the vertical synchronization signal Vsync.

An AF evaluating circuit 32 integrates a high frequency component of one portion of the Y data belonging to each evaluation area at each generation of the vertical synchronization signal Vsync. Thereby, 256 integral values, i.e., 256 AF evaluation values, are outputted from the AF evaluating circuit 32 in response to the vertical synchronization signal Vsync.

When a shutter button 36s arranged in a key input device 36 is in a non-manipulated state, an imaging mode is set to a normal mode. The CPU 34 executes a through image-use AE/AWB process that matches the normal mode based on the AE/AWB evaluation values outputted from the AE/AWB evaluating circuit 30, and calculates an appropriate aperture amount, an appropriate exposure time period, and an appropriate white balance adjusting gain that match the normal mode, as an appropriate imaging parameter. The calculated appropriate aperture amount, appropriate exposure time period, and appropriate white balance adjusting gain are set to the drivers 18b and 18c, and the camera processing circuit 20, respectively. As a result a brightness and a white balance of the through image displayed on the LCD monitor 28 are moderately adjusted.

Moreover, the CPU 34 executes an AF process under a continuous AF task when the shutter button 36s is in a non-manipulated state. When a person face is present in the object scene, some evaluation areas that cover a face image, out of the 256 evaluation areas shown in FIG. 2, are defined as an AF process-use extraction area. When the person face is not present in the object scene, all of the 256 evaluation areas shown in FIG. 2 are defined as the AF process-use extraction area.

When AF evaluation values belonging to the defined extraction area satisfy a predetermined AF starting condition (a condition under which a variation amount of the AF evaluation values between frames exceeds a reference), the CPU 34 notices these AF evaluation values, and executes a so-called hill-climbing process. The focus lens 12, which moves in an optical axis direction forward of the imaging surface under control of the driver 18a, is placed at a focal point.

When some evaluation areas that cover the person face are defined as the extraction area, the focus is on the person face. On the other hand, when all of the evaluation areas are defined as the extraction area, the focus is on a most proximal object i.e., an object present at a position closest to the imaging surface, out of objects present in the object scene.

Upon completion of the AF process, the CPU 34 references a position of the focus lens 12 at a current time point (a current interval between the focus lens 12 and the imaging surface) so as to calculate a distance from a lens distal end to the focused object, whereby subject distance information indicating the calculated distance is created. The subject distance information indicates a distance from the lens distal end to the person face when some evaluation areas that cover the person face are defined as the extraction area, and indicates a distance from the lens distal end to the most proximal object when all of the evaluation areas are defined as the extraction area.

Figure 3:
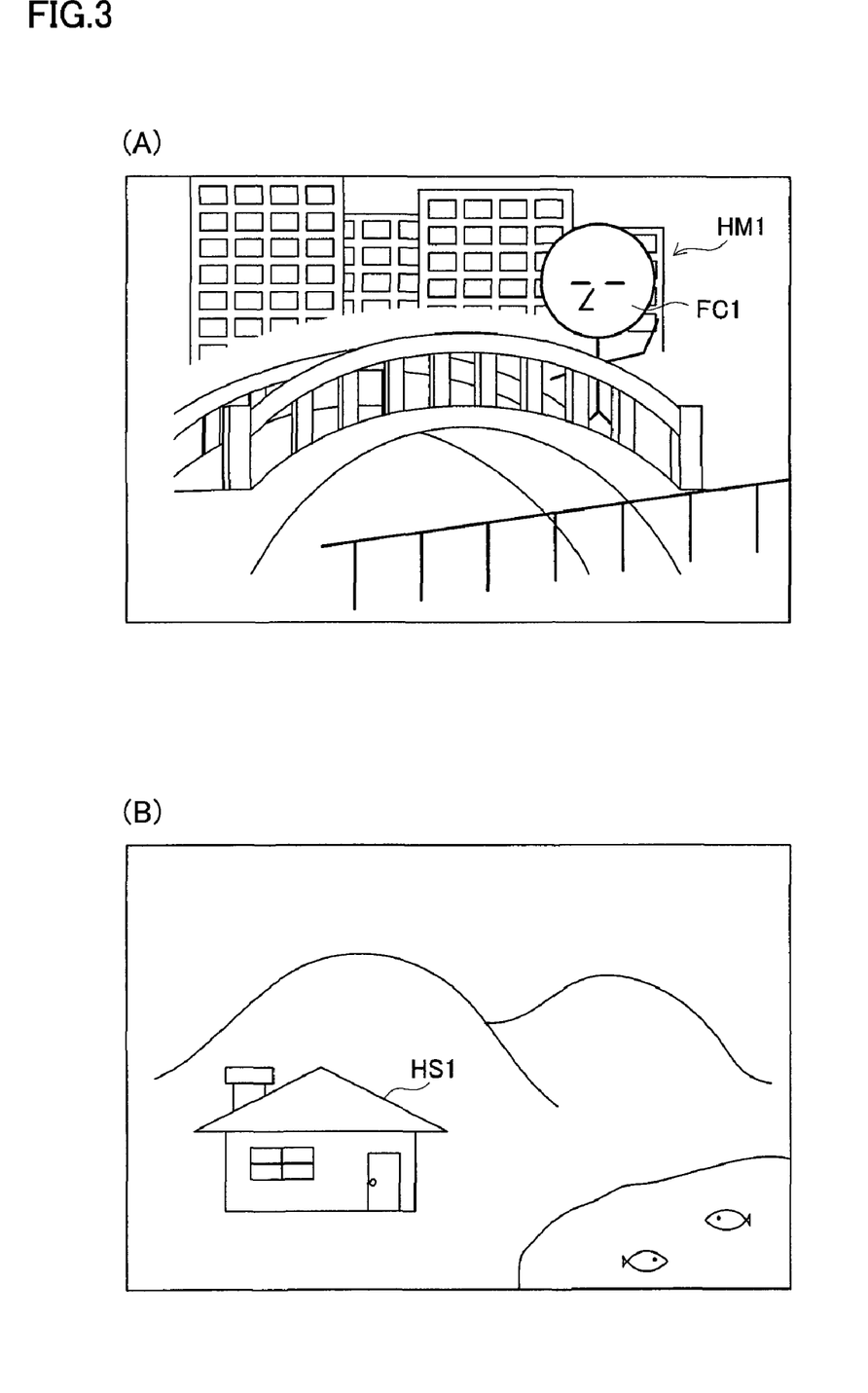
FIG. 3(A) is an illustrative view showing one example of an object scene captured in an embodiment in FIG. 1.
FIG. 3(B) is an illustrative view showing another example of the object scene captured in the embodiment in FIG. 1.

Therefore, when an object scene shown in FIG. 3(A) is captured the focus is on a face FC1 of a person HM1 and the subject distance information indicates a distance from the lens distal end to the face FC1. On the other hand, when an object scene shown in FIG. 3(B) is captured the focus is on a house HS1 and the subject distance information indicates a distance from the lens distal end to the house HS1.

It is noted that the object scene shown in FIG. 3(A) and the object scene shown in FIG. 3(B) are both equivalent to an object scene captured during a daytime. Moreover, the "lens distal end" means a distal end of a lens, present at a distal end of the lens unit LU.

When the shutter button 36s is half-depressed, the CPU 34 stops the continuous AF task, and selects an imaging mode according to the object scene under a mode setting process. Subsequently, in order to exactly adjust the focus, the CPU 34 executes the AF process again. The AF process is executed based on the AF evaluation values belonging to the extraction area defined under the continuous AF task. The focus lens 12 is placed at a focal point by a hill-climbing process.

Upon completion of the AF process, the CPU 34 executes a recording-use AE process based on the AE/AWB evaluation values outputted from the AE/AWB evaluating circuit 30 in a manner that matches the selected imaging mode. Thereby, an optimal aperture amount and an optimal exposure time period are calculated as an optimal imaging parameter of a current imaging mode. The calculated optimal aperture amount and optimal exposure time period are respectively set to the drivers 18b and 18c, similarly to the above-described case. As a result, a brightness of the through image displayed on the LCD monitor 30 is adjusted to an optimal value.

When the shutter button 36s is fully depressed, the CPU 34 applies a corresponding command to the driver 18c in order to execute a main exposure process. The driver 18c performs the main exposure on the imaging surface in response to the generation of the vertical synchronization signal Vsync, and reads out all the electric charges produced on the imaging surface in a raster scanning manner. As a result, high-resolution raw image data representing the object scene is outputted from the imaging device 16.

Subsequently, the CPU 34 executes a recording-use AWB process that matches the imaging mode selected by the mode setting process based on the AE/AWB evaluation values outputted, after the main exposure process, from the AE/AWB evaluating circuit 30. Thereby, an optimal white balance adjusting gain that matches the selected imaging mode is calculated as an appropriate imaging parameter. The calculated optimal white balance adjusting gain is set to the camera processing circuit 20. As a result, the high-resolution image data having the optimal white balance is outputted from the camera processing circuit 20, undergoes the memory control circuit 22, and is written in the SDRAM 24.

Upon completion of the recording-use AWB process, in order to execute a recording process, the CPU 34 applies a recording command to an I/F 38. The I/F 38 reads out the high-resolution image data accommodated in the SDRAM 24 through the memory control circuit 22, and records the read-out image data on a recording medium 40 in a file format. Upon completion of the recording process, the through image process is resumed. Also, the imaging mode is returned to the normal mode, and furthermore, the continuous AF task is re-started.

The mode setting process is executed as follows: Firstly, the subject distance information created under the continuous AF task is fetched under the imaging task. When the vertical synchronization signal Vsync is generated, the 256 AE/AWB evaluation values are fetched from the AE/AWB evaluating circuit 30, and an average luminance of the whole object scene, an average luminance of the evaluation block BKupr, and an average luminance of the evaluation block BKlwr are calculated based on the fetched AE/AWB evaluation values. The average luminance of the whole object scene is defined as "AVEfrm", the average luminance of the evaluation block BKupr is defined as "AVEupr", and the average luminance of the evaluation block BKlwr is defined as "AVElwr".

Subsequently, whether or not the distance indicated by the subject distance information (the distance to the focused object) exceeds a threshold value TH1 is determined, whether or not the average luminance AVEfrm exceeds a threshold value TH2 is determined, and whether or not a difference ΔAVE obtained by subtracting the average luminance AVElwr from the average luminance AVEupr exceeds a threshold value TH3 is determined.

When the distance to the focused object exceeds the threshold value TH1, the average luminance AVEfrm exceeds the threshold value TH2, and the difference ΔAVE exceeds the threshold value TH3, the imaging mode is finalized to a landscape mode (distant view mode).

When an object scene as shown in FIG. 3(B) is captured, the distance to the focused object, i.e., the house HS1, exceeds the threshold value TH1, the average luminance AVEfrm exceeds the threshold value TH2, and the difference ΔAVE exceeds the threshold value TH3. The imaging mode is set to the landscape mode corresponding to the object scene shown in FIG. 3(B).

On the other hand, when the distance to the focused object is equal to or less than the threshold value TH1, or the average luminance AVEfrm is equal to or less than the threshold value TH2, or the difference ΔAVE is equal to or less than the threshold value TH3, an another scene determining & mode finalizing process is executed.

When an object scene as shown in FIG. 3(A) is captured, the average luminance AVEfrm exceeds the threshold value TH2. However, the distance to the focused object, i.e., the face FC1, falls below the threshold value TH1 or the difference ΔAVE falls below the threshold value TH3. The imaging mode is set to a mode different from the landscape mode.

It is noted that when the scene is not explicitly determined even after an elapse of a 30-frame period from a start of the mode setting process, the imaging mode is finalized to the normal mode. The above-described recording-use AE/AWB process is executed in a manner that matches the imaging mode thus finalized.

Figure 7:
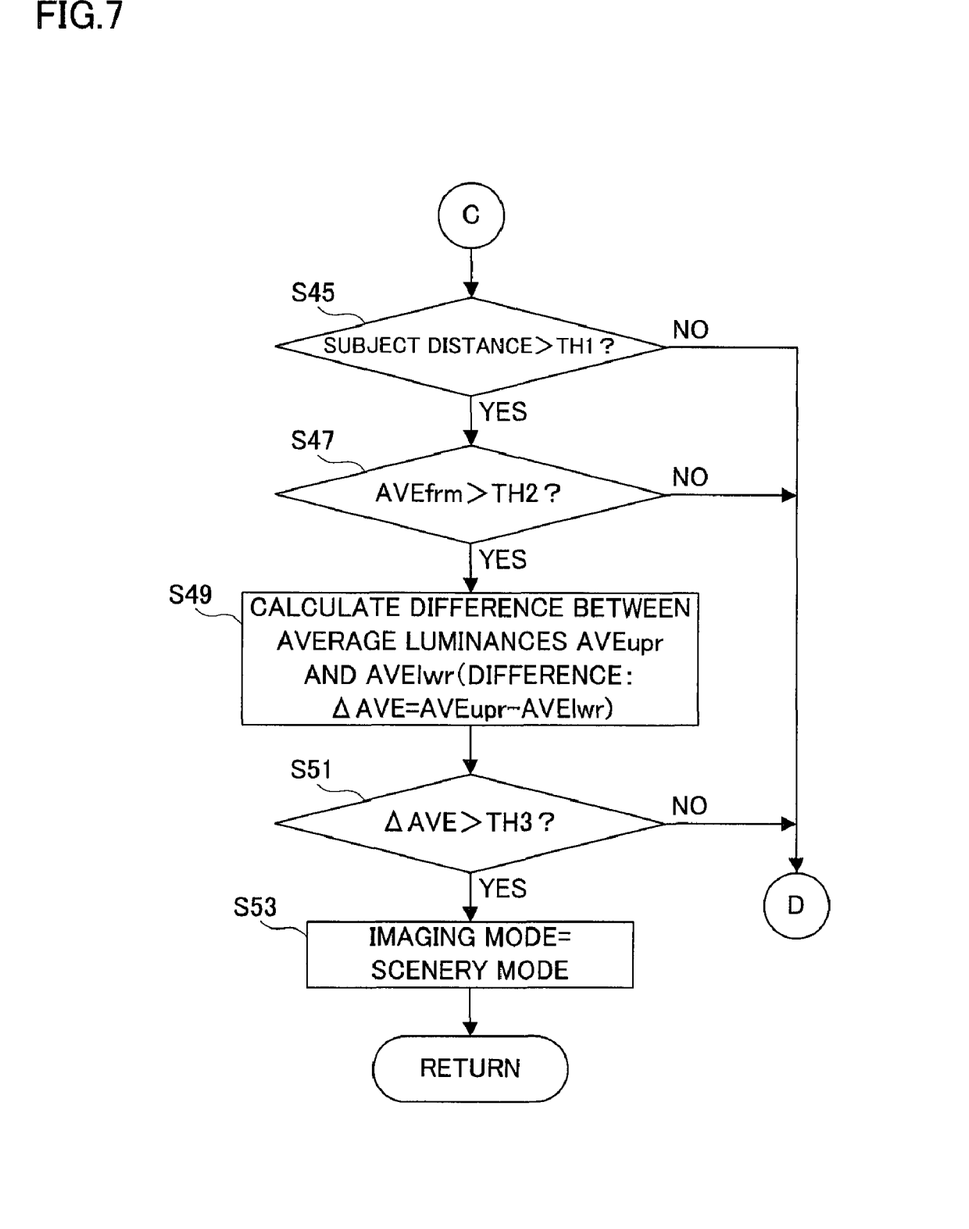
FIG. 7 is a flowchart showing yet still another portion of the operation of the CPU applied to the embodiment in FIG. 1.
Figure 8:
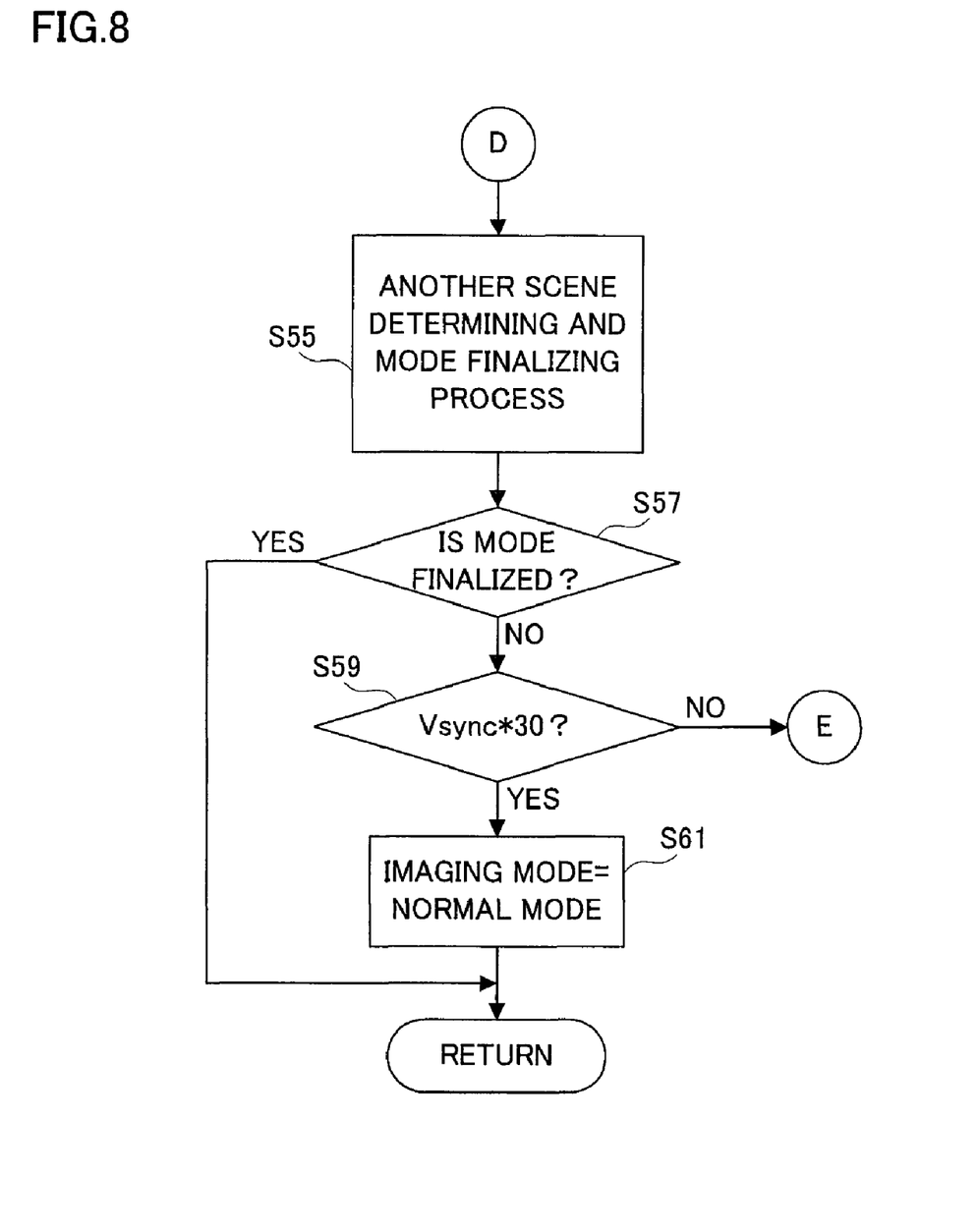
FIG. 8 is a flowchart showing another portion of the operation of the CPU applied to the embodiment in FIG. 1.
Figure 9:
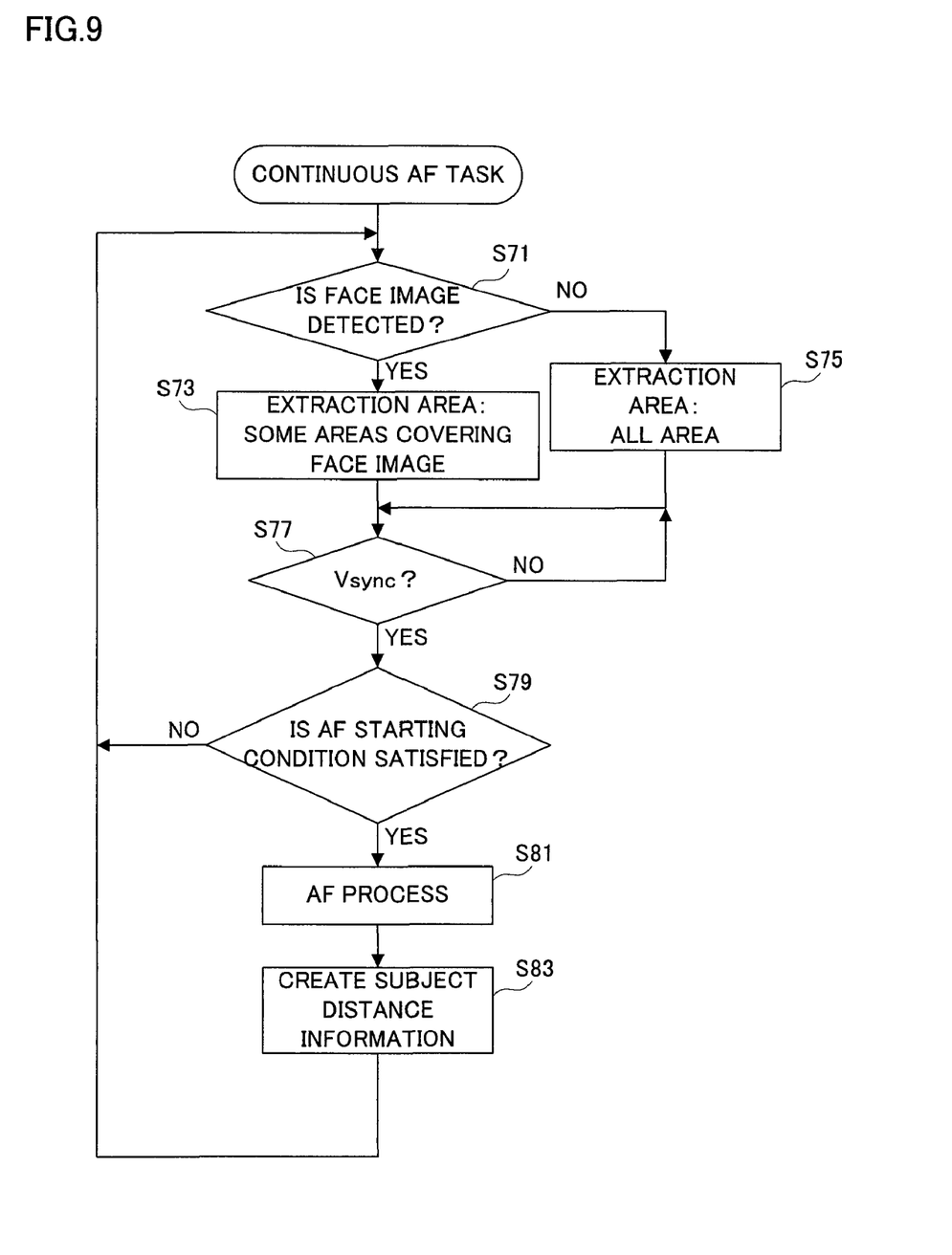
FIG. 9 is a flowchart showing still another portion of the operation of the CPU applied to the embodiment in FIG. 1.

The CPU 34 executes in parallel a plurality of tasks including an imaging task shown in FIG. 4 to FIG. 8 and a continuous AF task show in FIG. 9. It is noted that a control program corresponding to these tasks are stored in a flash memory 42.

Figure 4:
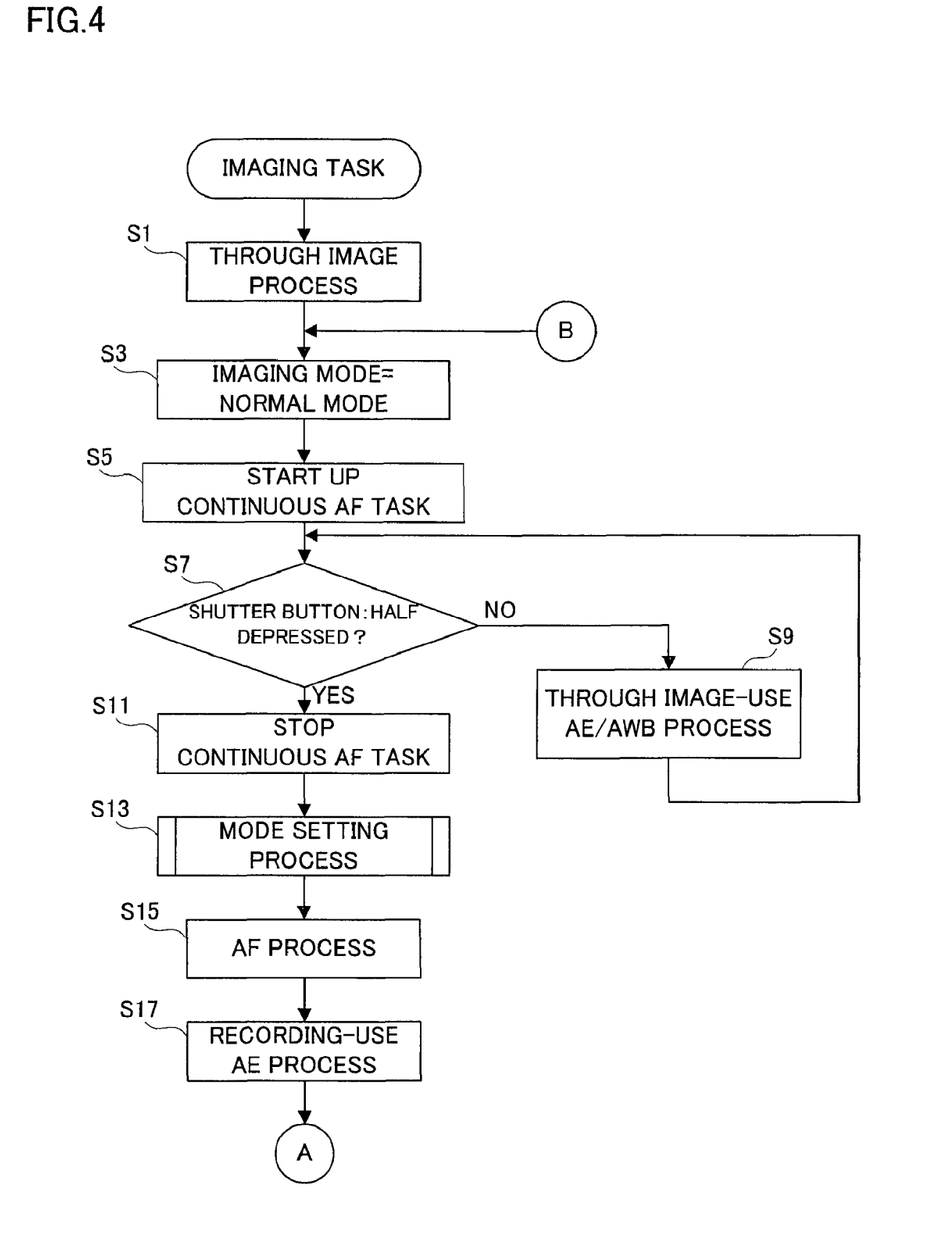
FIG. 4 is a flowchart showing one portion of an operation of a CPU applied to the embodiment in FIG. 1.

With reference to FIG. 4, in a step S1, in order to output a through image representing an object scene from the LCD monitor 38, a through image process is executed. Subsequently, in a step S3, the imaging mode is set to the normal mode, and in a step S5, the continuous AF task is started.

In a step S7, it is determined whether or not the shutter button 36s is half-depressed, and as long as a determination result is NO, a through image-use AE/AWB process in a step S9 is repeated. As a result, a brightness and a white balance of the through image is adjusted moderately in a manner that follows the normal mode.

When the shutter button 36s is half-depressed, the continuous AF task is stopped in a step S11. In a step S13, in order to select an imaging mode that matches the object scene, the mode setting process is executed. In a step S15, the AF process is executed, and in a step S17, the recording-use AE process is executed. By the process in the step S15, the focus lens 12 is placed at a focal point. Also, the recording-use AE process in the step S17 is executed in a manner that matches the selected imaging mode.

Figure 5:
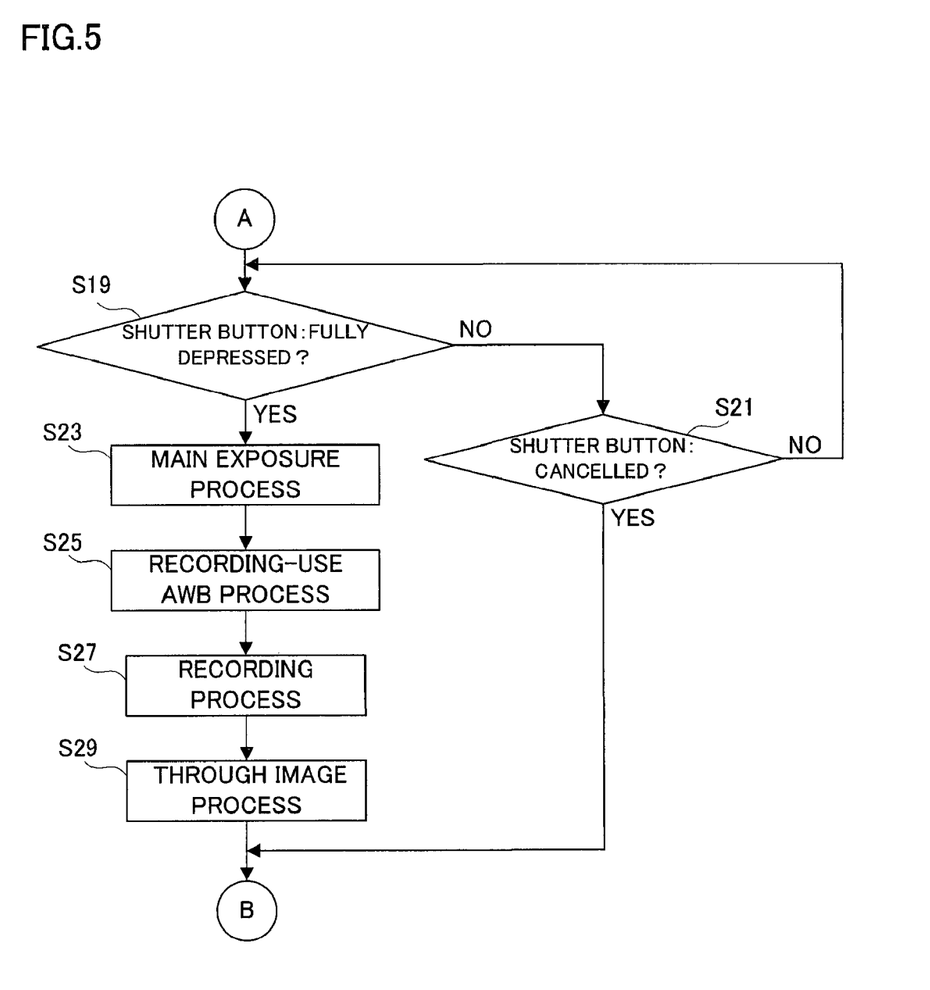
FIG. 5 is a flowchart showing another portion of the operation of the CPU applied to the embodiment in FIG. 1.

In a step S19, it is determined whether or not the shutter button 36s is fully depressed, and in a step S21, it is determined whether or not a manipulation of the shutter button 36s is cancelled. When YES is determined in the step S19, the main exposure process is executed in a step S23, and the recording-use AWB process that matches the imaging mode selected by the mode setting process is executed in a step S25. Upon completion of the recording-use AWB process, the process undergoes the recording process in a step S27 and the through image process in a step S29, and then, returns to the step S3. When YES is determined in the step S21, the process returns to the step S3 as it is.

Figure 6:
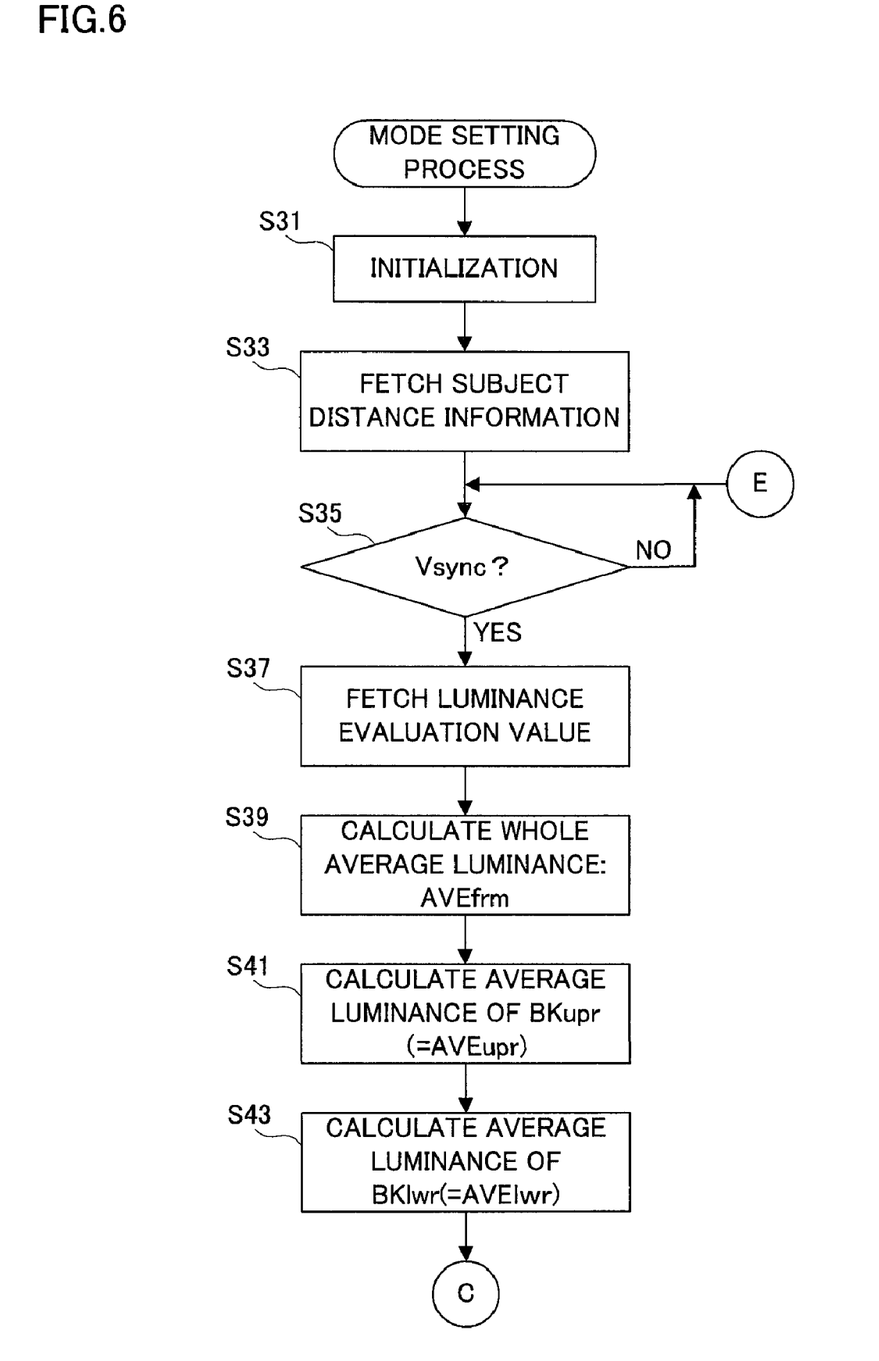
FIG. 6 is a flowchart showing still another portion of the operation of the CPU applied to the embodiment in FIG. 1.

The mode setting process in the step S13 shown in FIG. 4 is executed according to a subroutine shown in FIG. 6 to FIG. 8. In a step S31, an initializing process is executed, and in a step S33, subject distance information created in a step S83, described later, is fetched. When the vertical synchronization signal Vsync is generated, the process proceeds from a step S35 to a step S37 in which the 256 AE/AWB evaluation values are fetched from the AE/AWB evaluating circuit 30. In a step S39, based on the fetched AE/AWB evaluation values, the average luminance of the whole object scene is calculated as "AVEfrm". In a step S41, the average luminance of the evaluation block BKupr is calculated as "AVEupr", and in a step S43, the average luminance of the evaluation block BKlwr is calculated as "AVElwr".

In a step S45, whether or not the distance indicated by subject distance information fetched in the step S35 exceeds the threshold value TH1 is determined. Furthermore, in a step S47, whether or not the average luminance AVEfrm exceeds the threshold value TH2 is determined. When NO is determined at least in one of the steps S45 and S47, the process proceeds to a step S55, and when YES is determined in both the steps S45 and S47, the process proceeds to a step S49.

In the step S49, the average luminance AVElwr is subtracted from the average luminance AVEupr so as to calculate the difference ΔAVE, and in a step S51, whether or not the calculated difference ΔAVE exceeds the threshold value TH3 is determined. When NO is determined in the step S51, the process proceeds to a step S55. On the other hand, when YES is determined in a step S51, the imaging mode is finalized to the landscape mode in a step S53, and then, the process is restored to the routine at a hierarchically upper level.

In a step S55, the another scene determining & mode finalizing process is executed. In a step S57, whether or not the imaging mode is finalized by the process in the step S55 is determined, and in a step S59, whether or not the 30-frame period has been elapsed from a start of the mode setting process is determined. When YES is determined in the step S57, the process is restored to the routine at a hierarchically upper level as it is, and when YES is determined in the step S59, the imaging mode is finalized to the normal mode in a step S61, and then, the process is restored to the routine at a hierarchically upper level. When NO is determined in the both steps S57 and S59, the process returns to the step S35.

In the continuous AF task shown in FIG. 9, whether or not the person face is discovered from the object scene is firstly determined in a step S71. When YES is determined in this step, the process proceeds to a step S73 in which some evaluation areas that cover the face are defined as the extraction area. On the other hand, when NO is determined, all the evaluation areas are defined as the extraction area.

When the vertical synchronization signal Vsync is generated, the process proceeds from a step S77 to a step S79, and whether or not the AF starting condition is satisfied is determined based on the AF evaluation values of the extraction area defined in the step S73 or S75. When NO is determined in this step, the process returns to the step S71 as it is. However, when YES is determined, the process undergoes processes in steps S81 to S83, and then, returns to the step S71. In the step S81, the AF process in which the AF evaluation values of the extraction area defined in the step S73 or S75 are noticed is executed, and the focus lens 12 is placed at a focal point. In the step S83, a position of the focus lens 12 at a current time point is referenced to calculate the distance from the lens distal end to the focused object, and the subject distance information indicating the calculated distance is created.

As understood from the above-described description, the imaging device 16 has an imaging surface irradiated with an optical image of an object scene. The CPU 34 executes the AF process based on output of the AF evaluating circuit 32 (S81) so as to adjust the position of the focus lens 12 (interval between the focus lens 12 and the imaging surface) to a position (an interval) at which a specific object present in the object scene is optically converged. Upon completion of the AF process, the CPU 34 detects the distance from the lens distal end to the specific object by referencing a current position of the focus lens 12 (S83 and S33), and also, detects the brightness information of the object scene based on the output of the AE/AWB evaluating circuit 30 (S37 to S43, and S49). Also, the CPU 34 determines whether or not the detected distance and brightness information satisfy the predetermined condition so as to adjust the imaging parameter (S45 to S47, S51 to S53, S17, and S25).

Thus, in the object scene attribute to be noticed for adjusting the imaging parameter, not only the brightness information of the object scene but also the distance from the lens distal end to the specific object are included. This makes it possible to improve the accuracy for adjusting the imaging parameter.

It is noted that in this embodiment, the evaluation blocks BKupr and BKlwr are fixedly allocated to the upper end and the lower end of the imaging surface. However, it may be possible to change the allocation of the evaluation blocks BKupr and BKlwr according to a rotation of the imaging surface in a direction around an optical axis. Moreover, in this embodiment, a magnitude of the threshold value TH1 is fixed. However, the magnitude of the threshold value TH1 may be changed according to a zoom factor.

Figure 10:
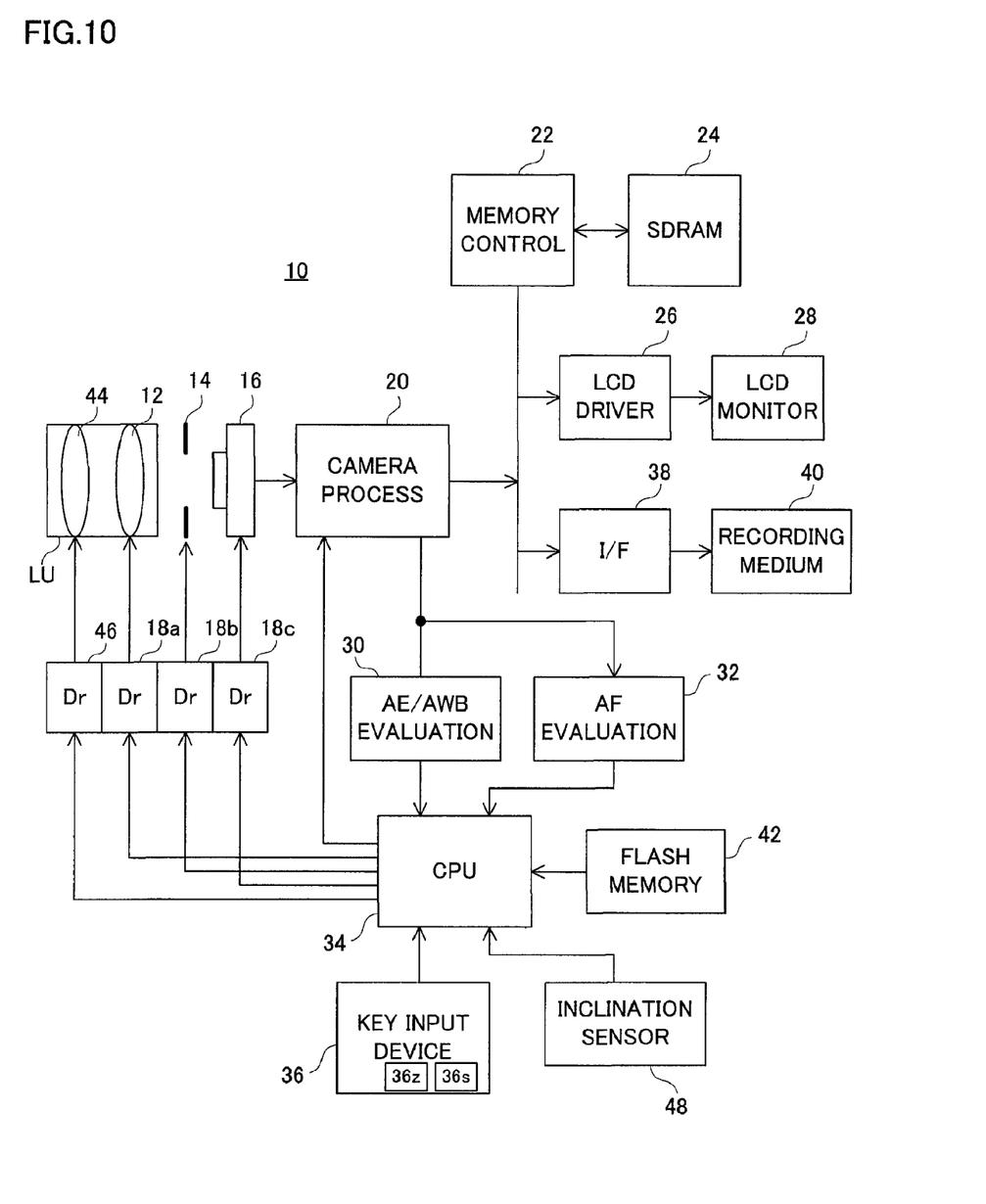
FIG. 10 is a block diagram showing a configuration of another embodiment of the present invention.
Figure 11:
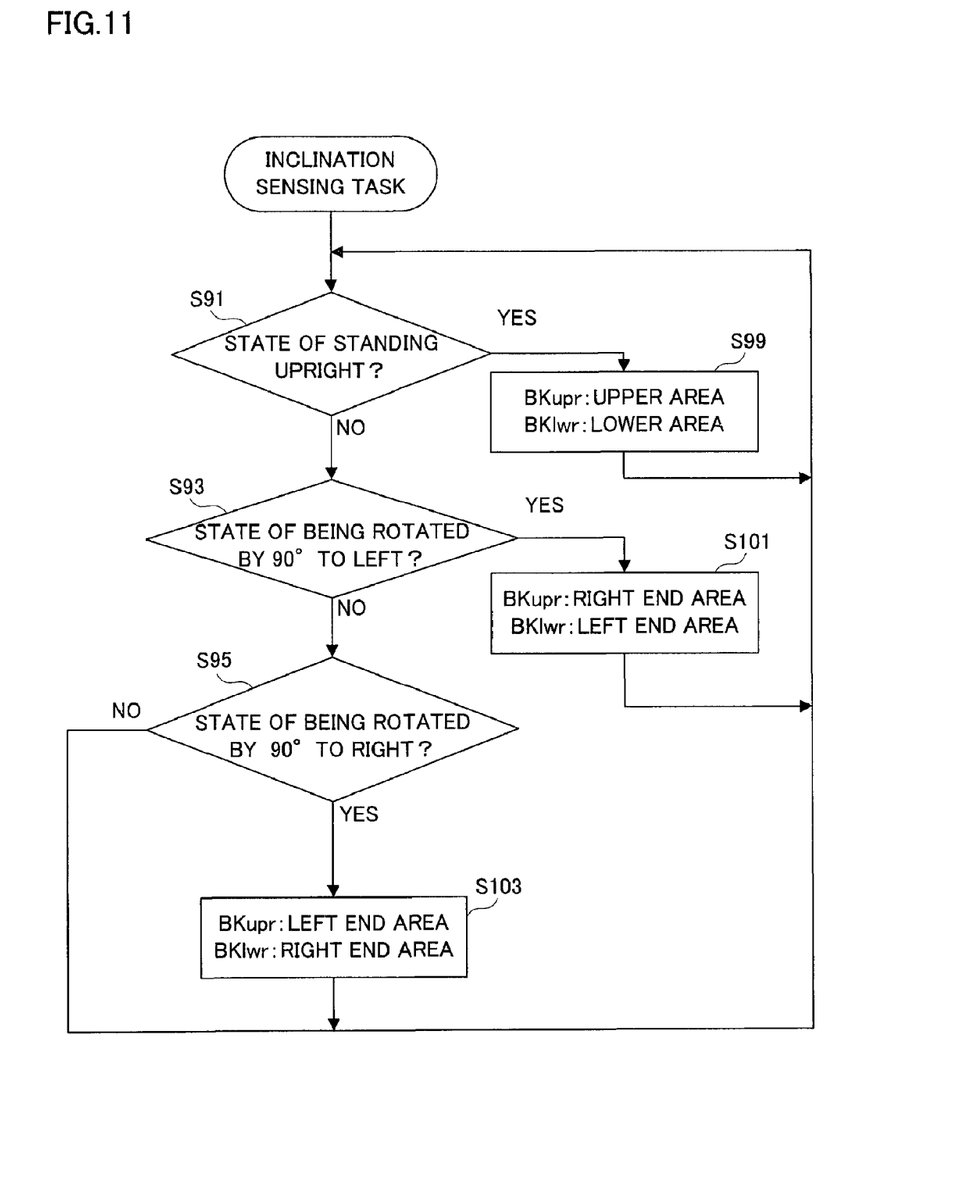
FIG. 11 is a flowchart showing one portion of an operation of a CPU applied to the embodiment in FIG. 10.
Figure 12:
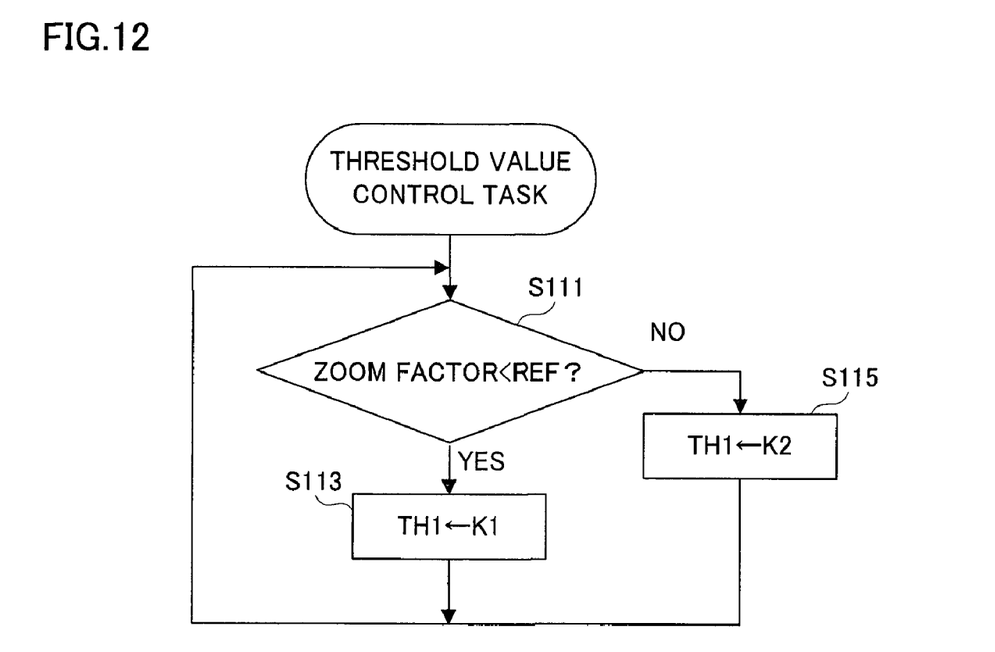
FIG. 12 is a flowchart showing another portion of the operation of the CPU applied to the embodiment in FIG. 10.

In this case, the digital camera 10 needs to be provided additionally with an inclination sensor 48, a zoom lens 44, a driver 46, and a zoom button 36z, as shown in FIG. 10, and furthermore, the CPU 34 needs to additionally execute an inclination sensing task shown in FIG. 11 and a threshold value controlling task shown in FIG. 12.

It is noted that the inclination sensor 48 is a sensor for sensing a rotating state of the imaging surface in a direction around an optical axis. Moreover, the zoom lens 44 moves in an optical axis direction by the driver 46 when the zoom button 36z is manipulated.

With reference to FIG. 1, in a step S91, whether or not the imaging surface is in a state of standing upright in the direction around an optical axis is determined, in a step S93, whether or not the imaging surface is in a state of being rotated by 90 degrees to a left in the direction around an optical axis is determined, and in a step S95, whether or not the imaging surface is in a state of being rotated by 90 degrees to a right in the direction around an optical axis is determined. The steps S91 to S95 are all determined based on output of the inclination sensor 48.

When YES is determined in the step S91, the process proceeds to a step S99 in which the evaluation blocks BKupr and BKlwr are allocated to the upper end and the lower end of the imaging surface in a manner shown in FIG. 2. When YES is determined in the step S93, the process proceeds to a step S101 in which the evaluation blocks BKupr and BKlwr are allocated to a left end and a right end of the imaging surface in a manner shown in FIG. 13(A). When YES is determined in the step S95, the process proceeds to a step S103 in which the evaluation blocks BKupr and BKlwr are allocated to a right end and a left end of the imaging surface in a manner shown in FIG. 13(B). Upon completion of the processes in the steps S99 to S103 or when NO is determined in all the steps S91 to S95, the process returns to the step S91.

According to FIG. 13(A), the evaluation block BKupr is formed by the 32 evaluation areas placed at the left end of the imaging surface, and the evaluation block BKlwr is formed by the 32 evaluation areas placed at the right end of the imaging surface. Moreover, according to FIG. 13(B), the evaluation block BKupr is formed by the 32 evaluation areas placed at the right end of the imaging surface, and the evaluation block BKlwr is formed by the 32 evaluation areas placed at the left end of the imaging surface.

With reference to FIG. 12, in a step S111, whether or not the zoom factor falls below a reference value REF is determined. When YES is determined in this step, the threshold value TH1 is set to a numerical value K (=2 m, for example) in a step S113. On the other hand, when NO is determined, the threshold value TH1 is set to a numerical value K2 (=10 m, for example) in a step S115. Upon completion of the process in the step S113 or S115, the process returns to the step S111.

It is noted that in the above-described embodiment the focus lens 12 is moved in the optical axis direction in the AF process. However, instead of the focus lens 12 or together with the focus lens 12, the imaging device 16 may be moved in the optical axis direction.

Moreover, this embodiment is so designed that when the scene is not explicitly determined even after an elapse of the 30-frame period from a start of the mode setting process, the imaging mode is finalized to the normal mode (see the steps S59 to S61 in FIG. 8). However, it is possible to promptly finalize the imaging mode to the normal mode when the scene is not explicitly determined.

Also, in this embodiment, when the imaging mode is finalized to the landscape mode, the mode setting process is ended (see the step S53 in FIG. 7). However, when a priority order is allocated to a plurality of scenes, i.e., a plurality of imaging modes, determined by the mode setting process, it is necessary to execute the another scene determining & mode finalizing process even after the imaging mode is finalized to the landscape mode. In this case, it is necessary to proceed to the step S55 after the process in the step S53, and it is further necessary to execute a process for selecting an imaging mode having a higher priority order from among a plurality of finalized imaging modes after YES is determined in the step S57.

Furthermore, in this embodiment, the distance from the lens distal end to the specific object is detected in adjusting the imaging parameter. However, instead thereof a distance from the imaging surface to the specific object may be detected.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electronic camera, comprising:
   an imager having an imaging surface irradiated with an optical image of a scene;
   a first detector which detects a distance to a specific object present in the scene;
   a second detector which detects brightness information of the scene in association with a detecting process of said first detector; and
   a determiner which determines whether or not the distance detected by said first detector and the brightness information detected by said second detector satisfy a predetermined condition so as to adjust an imaging parameter.

2. An electronic camera according to claim 1, further comprising:
   a focus lens placed forward of said imaging surface; and
   an adjuster which adjusts an interval between said focus lens and said imaging surface to an interval in which the specific object is optically converged, wherein
   said first detector detects the distance based on an adjustment result of said adjuster.

3. An electronic camera according to claim 1, wherein said predetermined condition includes a distance condition under which the distance exceeds a first threshold value.

4. An electronic camera according to claim 3, further comprising a changer which changes a magnitude of the first threshold value according to a zoom factor.

5. An electronic camera according to claim 1, wherein said second detector includes a whole-brightness detector which detects a whole brightness of the scene as at least one portion of the brightness information, and the predetermined condition includes a brightness condition under which the brightness detected by said whole-brightness detector exceeds a second threshold value.

6. An electronic camera according to claim 1, wherein said second detector includes a disparity detector which detects a disparity between an upper-portion brightness of the scene and a lower-portion brightness of the scene as at least one portion of the brightness information, and the predetermined condition includes a disparity condition under which the disparity detected by said disparity detector exceeds a third threshold value.

7. An electronic camera according to claim 6, further comprising a sensor which senses a rotating state of the imaging surface in a direction around an optical axis, wherein said disparity detector determines a hierarchical relationship of the scene by referencing a sense result of said sensor.

8. An imaging controlling program recorded on a non-transitory recording medium in order to control an electronic camera provided with an imager having an imaging surface irradiated with an optical image of a scene, the program causing a processor of the electronic camera to perform the steps comprising:
   a first detecting step of detecting a distance to a specific object present in the scene;
   a second detecting step of detecting brightness information of the scene in association with a detecting process of said first detecting step; and
   a determining step of determining whether or not the distance detected by said first detecting step and the brightness information detected by said second detecting step satisfy a predetermined condition so as to adjust an imaging parameter.

9. An imaging controlling method executed by an electronic camera provided with an imager having an imaging surface irradiated with an optical image of a scene, said imaging controlling method comprising:
   a first detecting step of detecting a distance to a specific object present in the scene;
   a second detecting step of detecting brightness information of the scene in association with a detecting process of said first detecting step; and
   a determining step of determining whether or not the distance detected by said first detecting step and the brightness information detected by said second detecting step satisfy a predetermined condition so as to adjust an imaging parameter.

10. An imaging controlling program according to claim 8, wherein said electronic camera is further provided with a focus lens placed forward of said imaging surface, and the program further causing said processor to perform an adjusting step of adjusting an interval between said focus lens and said imaging surface to an interval in which the specific object is optically converged, wherein said first detecting step detects the distance based on an adjustment result of said adjusting step.

11. An imaging controlling method according to claim 9, wherein said electronic camera is further provided with a focus lens placed forward of said imaging surface, and said imaging controlling method further comprising an adjusting step of adjusting an interval between said focus lens and said imaging surface to an interval in which the specific object is optically converged, wherein said first detecting step detects the distance based on an adjustment result of said adjusting step.

12. An electronic camera, comprising:
an imager having an imaging surface irradiated with an optical image of a scene;
a first detector which detects a positional relation in an optical axis direction between a specific object present in the scene and said imager;
a second detector which detects brightness information of the scene; and
an adjuster which adjusts an imaging parameter based on the positional relation detected by said first detector and the brightness information detected by said second detector.

13. An electronic camera according to claim 12, further comprising a zoom magnification changer which changes a zoom magnification, wherein said first detector includes a zoom magnification detector which detects the zoom magnification.

* * * * *